United States Patent
Cwik et al.

(10) Patent No.: US 10,037,622 B2
(45) Date of Patent: Jul. 31, 2018

(54) VIRTUAL TERRAIN ALTERATION SYSTEMS AND RELATED METHODS

(71) Applicant: Apple Inc., Cupertino, CA (US)

(72) Inventors: James J. Cwik, Mountain View, CA (US); Norman N. Wang, Saratoga, CA (US); Richard D. Roe, Union City, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 15/216,563

(22) Filed: Jul. 21, 2016

(65) Prior Publication Data

US 2017/0358121 A1 Dec. 14, 2017

Related U.S. Application Data

(60) Provisional application No. 62/349,083, filed on Jun. 12, 2016.

(51) Int. Cl.
*G06T 15/04* (2011.01)
*G06T 17/05* (2011.01)
*G06T 11/00* (2006.01)

(52) U.S. Cl.
CPC .............. *G06T 15/04* (2013.01); *G06T 11/00* (2013.01); *G06T 17/05* (2013.01)

(58) Field of Classification Search
CPC ........... G06T 17/05; G06T 2207/30236; G06T 15/04; G06T 15/00; G06T 11/001; G01C 21/005; G01C 21/3638; G01C 21/00
See application file for complete search history.

(56) References Cited

U.S. PATENT DOCUMENTS

| | | | |
|---|---|---|---|
| 8,953,872 B2 | 2/2015 | Shin et al. | |
| 8,976,169 B1* | 3/2015 | Barreirinhas | G06T 15/04 345/419 |
| 2014/0347373 A1 | 11/2014 | Shin et al. | |
| 2015/0130797 A1* | 5/2015 | Chen | G06K 9/00637 345/420 |
| 2015/0348284 A1 | 12/2015 | Bradbury et al. | |

OTHER PUBLICATIONS

Parberry, Designer Worlds: Procedural Generation of Infinite Terrain from Real-World Elevation Data, Journal of Computer Graphics Techniques vol. 3, No. 1, 2014, pp. 74-85.*

* cited by examiner

*Primary Examiner* — Haixia Du
(74) *Attorney, Agent, or Firm* — Ganz Pollard, LLC

(57) ABSTRACT

Systems and techniques for generating an artificial terrain map can compute a region of a noise map in an N-dimensional space and define a terrain characteristic in correspondence with a value of the noise map at each of a selected plurality of positions within the region of the noise map. The terrain characteristic can be projected at each of a selected plurality of positions within the region on a lower-dimensional sub-space. A map of an artificial terrain can be rendered based on the projection. The map of the artificial terrain can be scaled or otherwise manipulated in correspondence with scaling or otherwise manipulating the lower-dimensional sub-space. Generated maps in machine-readable form can be converted to a human-perceivable form, and/or to a modulated signal form conveyed over a communication connection.

20 Claims, 8 Drawing Sheets

VIRTUAL TERRAIN ALTERATION SYSTEMS AND RELATED METHODS

RELATED APPLICATIONS

This application claims benefit of and priority to U.S. Provisional Patent Application No. 62/349,083, filed on Jun. 12, 2016, which application is hereby incorporated by reference in its entirety for all purposes.

BACKGROUND

This application, and the innovations and related subject matter disclosed herein, (collectively referred to as the "disclosure") generally concern systems for procedurally altering maps of artificial terrain, and associated techniques. More particularly but not exclusively, disclosed systems and associated techniques pertain to altering terrain maps derived from one or more noise maps. As but one example, disclosed systems and techniques can scale or otherwise manipulate a map of artificial terrain by scaling or otherwise manipulating a subspace associated with the terrain. Some disclosed systems and techniques involve upsampling discretized, or sampled, noise maps for any of a variety of purposes. Such purposes can include managing limited computational and/or memory resources, and loading a map in a suitably short time. Disclosed approaches and systems for upsampling can maintain or achieve a desired map resolution without substantial distortion of a rendering of the map.

By way of background, noise maps can be used to generate artificial terrain for games. A noise map, generally, is a collection of randomly or pseudo-randomly selected numbers. Noise maps can have one or more dimensions. For example, a one-dimensional array populated with a collection of randomly or pseudo-randomly selected numbers constitutes a 1-D noise map, a two dimensional matrix populated with a collection of randomly or pseudo-randomly selected numbers constitutes a 2-D noise map, etc. Noise maps can be generated using a variety of approaches. As but one example, Perlin Noise is a publicly available algorithm for generating pseudo-random noise.

Noise maps having adjacent entries correlated with each other can ensure a smooth variation within the noise map. Such smoothly varying noise maps can be particularly well-suited for use in generating terrain maps for games, and generally are referred to in the art as being coherent. For example, each value in a noise map can be scaled to correspond to a height. Thus, a one-dimensional (1-D) noise map can be used to generate a cross-sectional hill profile, or a two-dimensional (2-D) noise map can be used to generate mountains and valleys in three-space.

A noise map can be computed in any number of dimensions, N, and can extend in each dimension infinitely subject to computer and memory limitations. Accordingly, applications that use noise maps often set a sample size along each respective dimension and, as a matter of convenience, typically establish integer-valued extents along each ordinate axis. Under such an approach, a finite region of a given noise map can be stored and accessed in a computationally efficient manner.

However, such sampling can lead to problems, particularly when using a noise map to generate an artificial terrain map. For example, a discretized noise map can have fewer samples than pixels on a display, leading to on-screen distortions when the noise map or a terrain map derived from the noise map is rendered to a display. Although a larger number of samples can sometimes be stored, as an alternative such a "brute-force" approach can lead to computational and memory inefficiencies. For example, a given application might require a high resolution (implying a high sample rate) only occasionally (e.g. in a particular region or during selected times), but those instances might be important when they arise. However, a "brute-force" approach of obtaining a larger number of noise map samples for those occasional instances imposes computational and memory overhead under all conditions. For example, loading a larger number of samples can take longer, manipulating a larger number of samples can require exponentially more computations, etc. Thus, despite that a higher resolution corresponding to a larger number of samples might be needed only occasionally, performance and efficiency can be reduced under most if not all conditions by simply increasing a sample size.

Thus, a need remains for computationally efficient systems and associated techniques to compute, discretize and store noise maps. As well, a need remains for techniques to procedurally generate artificial terrain maps with small amounts of stored data. A need also remains for systems that can initialize applications in a suitably short time. Further, a need remains for artificial terrain maps and other maps generated from a noise map to maintain a selected degree of resolution regardless of the scale at which the map is being observed or rendered.

SUMMARY

The innovations disclosed herein overcome many problems in the prior art and address one or more of the aforementioned or other needs. In some respects, the innovations disclosed herein generally concern systems and associated techniques for procedurally generating terrain maps and, more particularly but not exclusively, disclosed systems and associated techniques pertain to altering terrain maps derived from one or more noise maps. As but one example, disclosed systems and techniques can scale or otherwise manipulate a map of artificial terrain by scaling or otherwise manipulating a subspace. Some disclosed systems and techniques involve upsampling discretized, or sampled, noise maps for any of a variety of purposes. Such purposes can include obtaining suitable numbers of samples based on a number of pixels in a display, managing limited computational and/or memory resources, and loading a map in a suitably short time. For example, disclosed approaches and systems for upsampling can maintain or achieve a desired map resolution without substantially distorting a rendering of the map.

Methods for generating an artificial terrain map are disclosed. According to a first aspect, such methods compute a region of a noise map in an N-dimensional space and define a terrain characteristic in correspondence with a value of the noise map at each of a selected plurality of positions within the region of the noise map. The terrain characteristic, sometimes a measure of elevation, is projected at each of a selected plurality of positions within the region of the noise map on a lower-dimensional sub-space and a map of an artificial terrain based on the projection can be rendered. The map of the artificial terrain can be scaled and/or otherwise manipulated in correspondence with scaling and/or otherwise manipulating the lower-dimensional sub-space.

In some disclosed examples, used for illustrative purposes, the N-dimensional space is a two-dimensional plane, and the region of the noise map constitutes a planar region. In such instances, the lower-dimensional sub-space can be a line segment within the planar region, and the rendered map can be a two-dimensional elevation profile reflecting elevation contours along the line segment.

Scaling or otherwise manipulating the lower-dimensional sub-space can include any one or more of translating the line segment in a direction parallel to and/or perpendicular to the line segment, shortening the line segment, extending a length of the line segment, and rotating the line segment about a point positioned on the line segment. Such scaling and other manipulations can correspondingly alter a rendering of the terrain map derived from a prosection of the noise map on the line segment.

Some embodiments of disclosed methods also include storing the projection of the terrain characteristic. For example, the projection can include a value of the terrain characteristic corresponding to each of the selected plurality of positions within the region of the noise map. The values can be stored in an indexed array, and each index can correspond to a particular set of coordinates defining a position in the region of the noise map. A value of the noise map or the terrain characteristic can be estimated at a position between two indexed positions in correspondence to respectively adjacent indexed entries in the array.

As a consequence, the computed noise map can be discretized, and the resulting samples can be stored in an indexed array. And, the computed noise map can be upsampled using any of a variety of disclosed or other interpolation approaches.

A target duration for computing the noise map can be established, and the number of samples can be selected or adjusted to correspond to the selected target duration, or time. As well, the number of samples, can be adjusted or selected based at least in part on a duration required to compute a region of the noise map at one or more earlier times.

Also disclosed are tangible, non-transitory computer-readable media including computer executable instructions that, when executed, cause a computing environment to implement one or more methods disclosed herein. Digital signal processors suitable for implementing such instructions are also disclosed and can be embodied in software, firmware, or and/or hardware. In some instances, a disclosed artificial terrain map, or other map derived from a noise map, can be rendered into a human-perceivable form, and/or transformed into a modulated signal conveyed over a communication connection.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

The following describes various innovative principles related to systems for procedurally generating and/or altering maps of artificial terrain from noise maps, and associated techniques by way of reference to specific system embodiments. For example, certain aspects of disclosed subject matter pertain to systems and techniques for scaling or otherwise manipulating a map of artificial terrain by scaling or otherwise manipulating a subspace associated with the terrain. As well, some disclosed embodiments pertain to up-sampling of noise maps for any of a variety of purposes. Embodiments of such systems described in context of specific terrains, noise maps, and subspaces are but particular examples of contemplated systems chosen as being convenient illustrative examples of disclosed principles. One or more of the disclosed principles can be incorporated in various other systems to achieve any of a variety of corresponding system characteristics.

Thus, systems and associated techniques having attributes that are different from those specific examples discussed herein can embody one or more presently disclosed innovative principles, and can be used in applications not described herein in detail, for example, in rendering special effects for film, or procedurally generating simulations of other random or pseudo-random phenomena. Accordingly, such alternative embodiments can also fall within the scope of this disclosure.

I. Overview

This disclosure concerns systems and associated techniques for procedurally generating and altering maps of artificial terrain from noise maps, and associated techniques. In some respects, disclosed systems and techniques for upsampling a noise map are disclosed. Such techniques can maintain or achieve a desired map resolution without substantially distorting a rendering of the map and are described in Section II.

Figure 1:
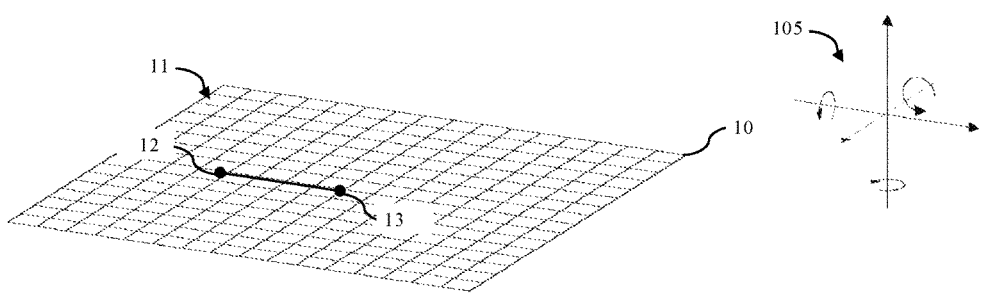
FIG. 1 illustrates an isometric view of a two-dimensional noise map.

Referring now to FIG. 1, a noise map 10 in a space 11 having a selected dimensionality can be computed at discrete nodes, as to balance fidelity considerations against computational limits and memory capacity of a given computing environment. Moreover, a subspace (e.g., depicted in this example by the line segment extending between points 12 and 13) can reside within the space 11. In the example shown in FIG. 1, the space 11 constitutes a two-dimensional plane, and the subspace constitutes a line segment lying in the plane.

As described more fully below, each value of the noise map 10 can constitute an input to a function used to compute, for example, a dimension (e.g., an elevation) along a third-coordinate axis orthogonal to the plane 11, as indicated by the coordinate axes 105. Thus, with values of the noise map along the line segment extending from point 12 to point 13, an elevation profile 20 (FIG. 2) can be derived. For example, the value of the noise map 10 at point 12 can correspond to the elevation 22 depicted in FIG. 2, and the value of the noise map at point 13 can correspond to the elevation 23. The profile 20 depicts elevations corresponding to variation in the noise-map value at points along the line segment between points 12, 13.

Section III describes systems and associated techniques that concern scaling or otherwise manipulating terrain maps (e.g., an elevation profile) derived from one or more noise maps. Such systems and techniques can be used, for example, to dynamically change terrain in a game world.

Section IV describes systems and methods for computing, generating, or otherwise loading a noise map within a selected time duration. Section V describes terrain-generation engines, and Section VI describes computing environments suitable for implementing disclosed methods and techniques.

Related aspects also are disclosed. For example, the following describes machine-readable media containing instructions that, when executed, cause a processor, e.g., of a computing environment, to perform disclosed methods. Such instructions can be embedded in software, firmware, or hardware. In addition, disclosed methods and techniques can be carried out in a variety of forms of signal processor, again, in software, firmware, or hardware.

Additional details of disclosed systems, and associated techniques and methods, follow.

II. Memory Efficient Storage and Upsampling

Figure 3:
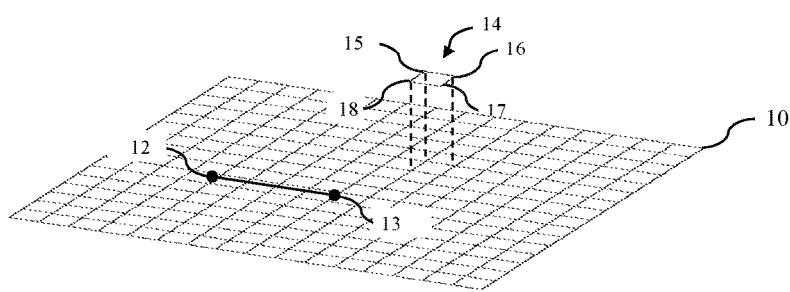
FIG. 3 illustrates a discretized 2-D noise map as in FIG. 1.

In FIG. 3, a planar region 14 of the noise map 10 (lifted out-of-plane to facilitate this description) is bounded by four nodes 15, 16, 17, 18. The noise map (a continuous function) can be computed (or sampled) at each of nodes 15, 16, 17, 18. As well, the noise map 10 can be computed at each of the remaining nodes (not numbered for clarity) shown in FIG. 3. Similarly, discrete values of the noise map can be determined along the line segment extending between points 12, 13. Each p computed value of the noise map can be stored in a memory.

A data structure can store a vector or an array of noise-map values at discrete, integer-indexed locations (sometimes also referred to as positions or entries) within the vector or array. Each integer-indexed entry can correspond to a respective, discrete and known physical location within a given noise map, whether the noise map is one-dimensional, two-dimensional, or three-dimensional. For example, a discrete location within a one-dimensional noise map can be fully specified with a single coordinate. Similarly, a discrete position within a two-dimensional or a three-dimensional noise map can be specified with a group of two or three coordinates, respectively. More generally, each discrete location in a space of any dimension can be identified by a corresponding set of coordinates within the respective noise map.

Figure 4:
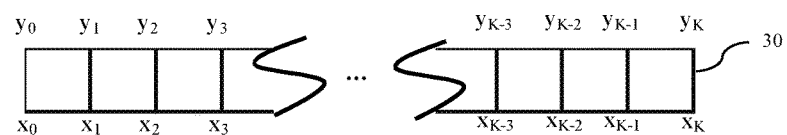
FIG. 4 depicts a linear array suitable for storing discretized noise-map values projected on, for example, a line segment.

Referring now to FIG. 4, the noise-map value y along the line defined by the points 12 and 13, which lie in the plane 11 (FIGS. 1, 3), can be discretized as $y_k$ and stored in the array 30. As well, each index of the array 30 can correspond to a discrete coordinate location, $x_k$, along the line.

A value of the noise map at a position between or among a group of discrete physical locations in the noise map 10, referred to herein as an intermediate position, can be estimated from the values $y_k$ of the noise map stored in the integer-indexed entries. The value of the noise map at the intermediate position $x_n$ is referred to herein as an intermediate value $y_n$. For example, if the underlying noise function is assumed to be coherent, any of a variety of linear or non-linear interpolations can be used estimate an intermediate value of the noise map at any intermediate position.

As but one example for illustrative purposes, values of a given noise map can be assumed to vary linearly between adjacent discrete physical locations for which values of the noise map are stored in the indexed array. On those assumptions, an intermediate value of the noise map can be estimated with a linear interpolation between or among the indexed noise-map values based on the set of coordinates describing each discrete physical location corresponding to the respective index values and the set of coordinates describing the intermediate position. For a one-dimensional array, an intermediate value of the noise map can be estimated from the following:

$$y_n = \left(\frac{y_k - y_{k-1}}{x_k - x_{k-1}}\right)(x - x_{k-1}) + y_{k-1}$$

where, $y_n$ is the estimated value of the noise map at a given physical position having coordinate, $x_n$;

$y_k$ is the noise-map value at a discrete physical location having coordinate $x_k$ and which is stored in the $k^{th}$ entry of the array;

$y_{k-1}$ is the noise-map value at a discrete physical location having coordinate $x_{k-1}$ and which is stored in the $(k-1)^{th}$ entry of the array $x_k$ is the coordinate position in the noise map corresponding to the noise-map value $y_k$ stored in the $k^{th}$ entry of the array;

$x_{k-1}$ is the coordinate position in the noise map corresponding to the noise-map value $y_{k-1}$ stored in the $(k-1)^{th}$ entry of the array; and x is the coordinate position in the noise map for which the noise-map value is estimated as $y_n$.

Although a linear interpolation for a one-dimensional noise map having discrete values stored within a one-dimensional array is described in detail above, other approaches for estimating an intermediate value are available. For example, an intermediate value of a noise map at an intermediate position positioned among four discrete physical positions in a given two-dimensional noise map can be estimated from the four sets of coordinates describing the corresponding discrete physical positions of the surrounding nodes and the corresponding noise map values at the nodes using a bilinear interpolation approach. Similarly, intermediate values in a discretized three-dimensional noise map can be estimated using a trilinear interpolation approach.

Approaches for estimating an intermediate value of a discretized noise map are not limited to linear approaches. A variety of non-linear approaches can be used. As but several examples, polynomial interpolation, spline interpolation, and Gaussian-process (or other probabilistic) interpolation approaches can be used. In addition, a variety of other upsampling approaches commonly used in digital signal processing can be used to estimate intermediate values of a given discretized noise sample.

Such approaches permit a noise map to be queried at any selected location and maintain a measure of coherence of the noise map in instances when the noise-map's size exceeds a rendered representation or other discretized store of the map.

III. Terrain Modification

As noted above, a 2-D noise map 10 can be used to define a terrain profile in a third dimension. A height of the terrain at any given position can be determined by a virtual shape within a noise map, as shown by way of example in FIG. 2. A value of the noise map 10 along the line segment 12, 13 between two points can be transformed into an elevation profile. For a 2-D game with a profile view of terrain, as in FIG. 2, a 2-D noise map can be used with a 1-D line segment (e.g., extending between points 41 and 42 in FIG. 5) to scale or otherwise manipulate the elevation profile.

Figure 5:
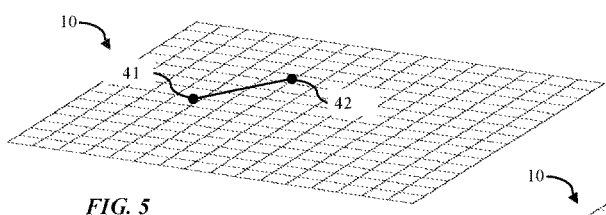
FIGS. 5 through 10 depict manipulations of a line segment within a 2-D plane.
Figure 6:
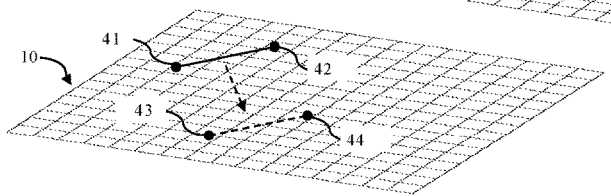

In FIG. 5, the line segment 41-42 can correspond to a width of a display on which an elevation profile (as in FIG. 2) is rendered. Thus, when the line segment 41-42 is translated perpendicular to its length, as depicted in FIG. 6, a corresponding depiction of the elevation profile changes. With regard to FIG. 6, the elevation profile changes from one defined along the segment 42-43 to a profile defined along the segment 43-44. If the elevation profile along the line segment is rendered on a display as the segment translates as in FIG. 6, the rendered terrain profile correspondingly undulates and changes shape while appearing not to slide across the display.

Figure 2:
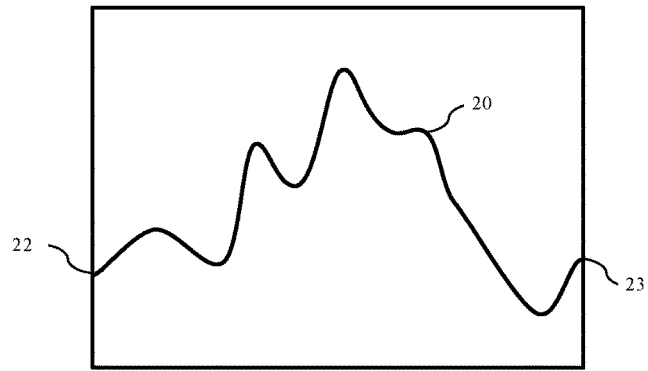
FIG. 2 illustrates an artificial terrain profile derived from a projection of the noise map shown in FIG. 1 on the line segment depicted in FIG. 1.
Figure 7:
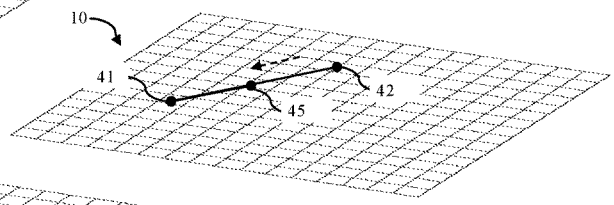

Referring now to FIG. 7, if the line segment 41-42 is compressed to a segment 41-45, the rendered elevation profile appears to "zoom-in" on the terrain between the points 41 and 45. In such an instance, the number of discrete noise-map values stored in an array as described above can be insufficient to render an apparently continuous elevation profile as depicted in FIG. 2. Nonetheless, the stored discretization of the noise map 10 can be upsampled as described above to provide a more detailed rendering of the elevation profile, as may be suitable in some instances.

As the line segment 41-42 translates along the line defined by the points 41 and 42 e.g., to a position between points 46, 47 (FIG. 8), an on-screen rendering of the elevation profile as in FIG. 2 can appear to slide across the screen.

Figures 8, 9, 10:
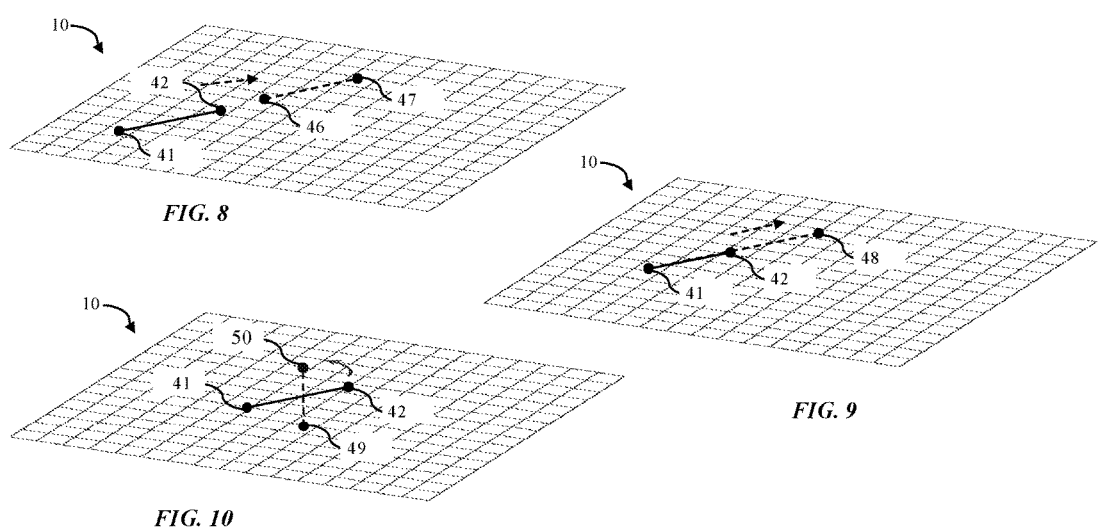

Referring now to FIG. 9, lengthening the segment 41-42 to extend between points 42 and 48 can cause the rendered elevation profile to appear to zoom out.

Referring now to FIG. 10, rotating the segment 41-42 from the illustrated orientation to the orientation of the segment 49-50, while keeping the segment a constant length, can cause a rendered elevation profile to appear to undulate and change shape, similar to that described in connection with FIG. 5. However, the rate of change of the elevation profile will vary from no change at the center of rotation (e.g., the point of intersection between segment 41-42 and segment 49-50) to a highest rate of change at the edges of the profile corresponding to the opposed ends of the rotating line segment.

As noted, such a line segment 41-42 can be rotated, translated, stretched and/or compressed to achieve varying effects to terrain morphing. Such rotation, translation, extension and compression can occur singly or in combination.

Figure 11:
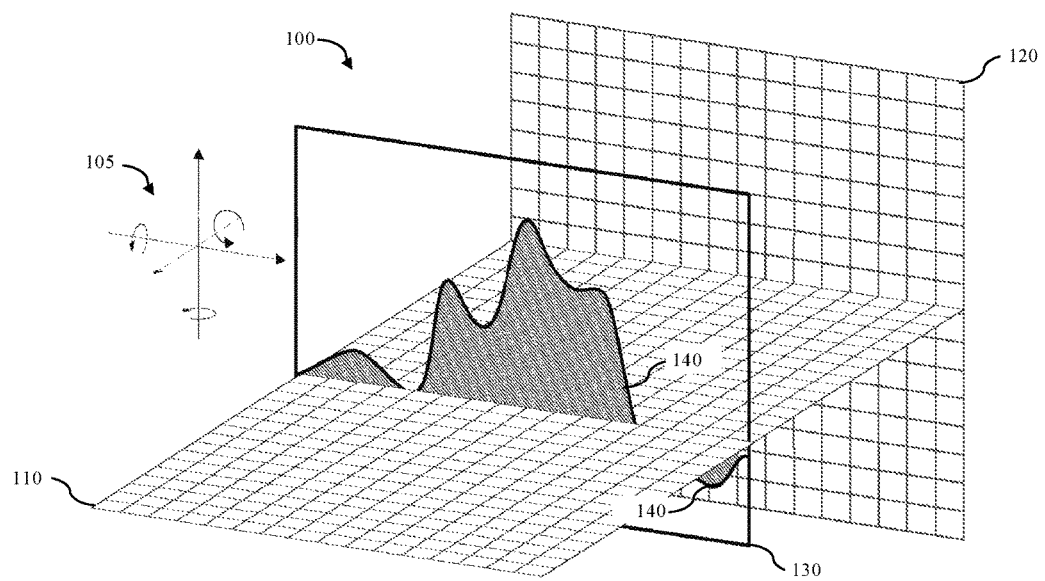
FIG. 11 depicts a three-dimensional space containing a projection of a terrain on a planar region.

Sub-space scaling or other manipulation as described above can be extended to higher-dimensional spaces. For example, as FIG. 11 indicates, a 3-D space 100 can be characterized by coordinate axes 105. A 3-D terrain having an elevation defined relative to the plane 110 can be projected onto a planar region 130 to generate a cross-sectional profile 140 (indicated by shading). The plane 120 is shown to more clearly indicate the space 100 has three dimensions.

Similar to the scaling and other manipulations of the line segment described above in relation to FIGS. 5 through 10, the planar region 130 can be scaled or otherwise manipulated to corresponding 14 scale or otherwise manipulate a rendering of the terrain profile 140.

More particularly, the planar region 130 can be lengthened or shortened along either or both in-plane coordinates. As a consequence of such scaling, the projection 140 will correspondingly appear to zoom out (e.g., from lengthening) or zoom in (e.g., from shortening).

As well (or alternatively), the planar region 130 can be rotated about one or more axes 105 and the projection on to that planar region will vary in accordance with the terrain in the 3-D space 100. For example, if the planar region 130 is rotated about a "vertical" axis relative to the terrain, the projection of the terrain will undulate and change at various rates between the opposed edges of the planar region 130 with no change occurring along the axis of rotation.

The planar region 130 can be translated along an in-plane axis and the cross-sectional profile 140, or a rendering thereof, will appear to translate in an opposite direction. For example, if the plane "slides" in a "horizontal" and in-plane direction, the projection will appear to "slide" in an opposite direction as well. Similarly, if the plane translates in an out-of-plane direction, the rendered contours of the terrain 140 will undulate, similarly as described above in relation to translating the line segment 41-42 in FIG. 6.

In a general sense, disclosed systems and methods can modify a rendering of an N-dimensional space by projecting the N-dimensional space to a lower-dimensional sub-space (e.g., a line (1-D) if the game world is 2-D or 3-D; a plane (2-D) if the world is 3-D), allowing the projection to be scaled or otherwise manipulated in correspondence with scaling or manipulating the sub-space. To maintain or improve resolution after scaling or otherwise manipulating a projection, intermediate values of a corresponding discretized noise map can be upsampled as appropriate using an approach as described more fully above.

Figure 12:
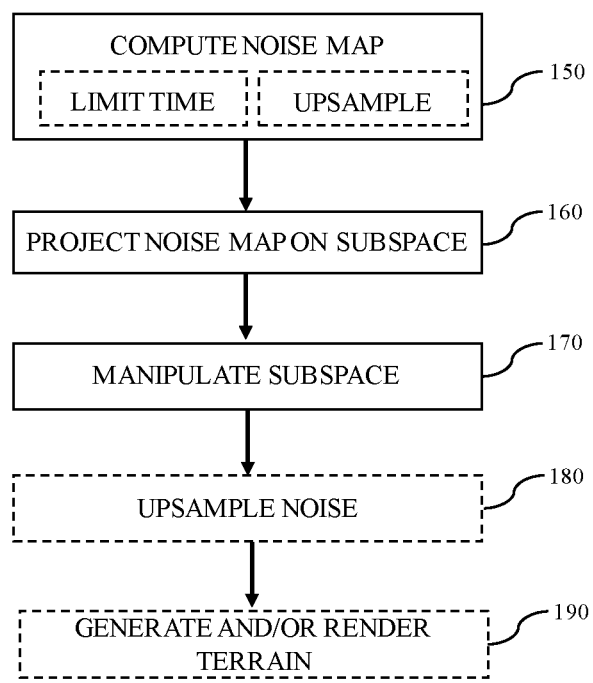
FIG. 12 illustrates block diagram of a process for altering an artificial terrain.

FIG. 12 illustrates aspects of disclosed methods for generating, scaling, and/or otherwise manipulating artificial terrain. A noise map can be computed at 150. As described above, a computation time can optionally be selected, and the number of samples computed can be chosen to timely compute the noise map. As well, the sampled noise map can be upsampled as appropriate using an approach described above. The noise map can be projected onto a lower-dimensional subspace at 160. The subspace can be scaled or otherwise manipulated at 170. The noise map can be upsampled at 180 (e.g., after scaling or otherwise manipulating) and a terrain can be generated and/or rendered at 190.

IV. Terrain Generation Engines

Figure 13:
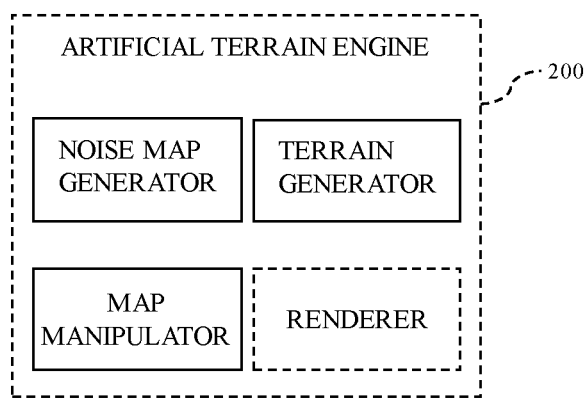
FIG. 13 schematically illustrates an artificial terrain engine suitable to perform a method as disclosed herein.

As FIG. 13 shows, an artificial terrain engine according to disclosed techniques can have a noise-map generator configured to generate a noise map. A terrain generator can load or otherwise generate a terrain as described above. A map manipulator can scale or otherwise manipulate the terrain according to scaling or otherwise manipulating a subspace with a projection of the noise map or the generated terrain. Artificial terrain engines as described herein can include a renderer configured to render the terrain map on a display.

V. Time Constrained Generation or Loading of a Noise Map

The time required to compute (or generate) a noise map can vary according to a number of factors. For example, such factors can include computational complexity of the functions used to compute the noise map, hardware computational speed, number of (and computational load imposed by) concurrently running processes, etc.

Nonetheless, disclosed noise-map generators permit a developer to specify a target duration during which a noise map is to generate. For example, a developer might wish to generate a noise map within about 5 milliseconds after calling a noise-map generator, such as between about 2 milliseconds and about 10 milliseconds, with between about 3.5 milliseconds and about 7 milliseconds being but one particular example.

Such a generator can dynamically adjust the number of noise samples it computes in an attempt to satisfy the target-time constraint. In some instances, a target number of samples can be computed using information from a feedback loop to meet the target time duration.

The dynamic adjustment can be implemented in a number of ways. For example, the duration can correspond to a desired frame-rate (or fraction thereof), and the number of samples can be selected to achieve the desired duration based on information gleaned from prior calculations. As but one example, a running average of a ratio of samples to duration (or another suitable measure of computational duration) can be used to estimate a target number of samples to use in a current computation.

In that example, the process can begin with an initial number of noise samples to generate. The initial number of noise samples can be specified by a developer and constitute a default value. The generator can monitor the time required to generate the noise-map with the initial number of samples. That time can be compared to the target time, and the number of samples used in a subsequent computation or generation of a noise map can be proportionately adjusted up or down in correspondence to a difference between the target time to compute the noise map and the actual time to compute the target time. Alternatively, the number of samples can remain unchanged on the assumption that larger numbers of samples will require longer computational time, smaller numbers of samples will require shorter computational time, and a constant number of samples will leave the computational time unchanged.

When an actual time exceeds a target time, the number of samples taken during a subsequent generation can be reduced. Such a system can be suited for real-time animation (e.g. 30 or 60 fps) of noise data while managing memory consumption and/or computational load at a given moment.

In some instances, computing a noise map can result in a relatively higher-order of complexity as compared to complexity of an interpolation computation as described below. Accordingly, some noise-map generators can generate a relatively sparse sampling of a given noise map. Resolution of a sparse noise map can be improved by generating one or more intermediate values for the computed noise map using such an interpolation (e.g., an upsampling) approach described above.

IX. Computing Environments

Figure 14:
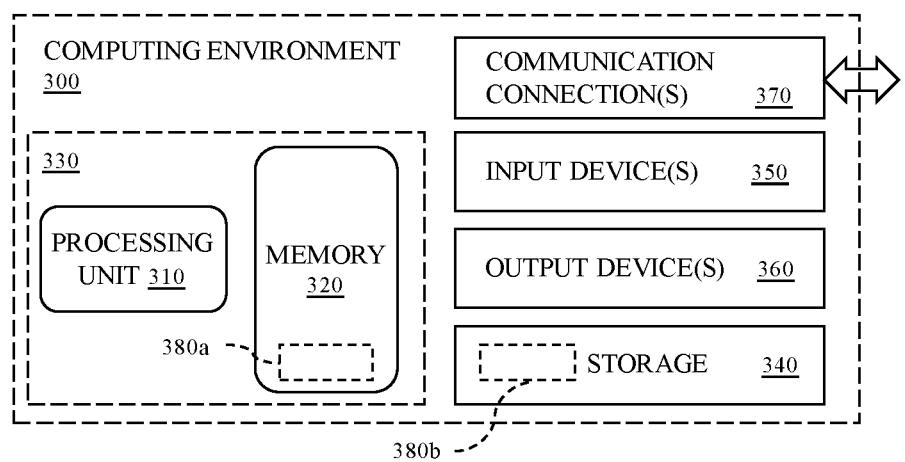
FIG. 14 illustrates a block diagram of a computing environment as disclosed herein.

FIG. 14 illustrates a generalized example of a suitable computing environment 300 in which described methods, embodiments, techniques, and technologies relating, for example, to procedurally generating, scaling, and/or otherwise manipulating an artificial terrain map. The computing environment 300 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 300 includes at least one central processing unit 310 and memory 320. In FIG. 14, this most basic configuration 330 is included within a dashed line. The central processing unit 310 executes computer-executable instructions and may be a real or a virtual processor. In a multi-processing system, multiple processing units execute computer-executable instructions to increase processing power and as such, multiple processors can run simultaneously. The memory 320 may be volatile memory (e.g., registers, cache, RAM), non-volatile memory (e.g., ROM, EEPROM, flash memory, etc.), or some combination of the two. The memory 320 stores software 380$a$ that can, for example, implement one or more of the innovative technologies described herein, when executed by a processor.

A computing environment may have additional features. For example, the computing environment 300 includes storage 340, one or more input devices 350, one or more output devices 360, and one or more communication connections 370. An interconnection mechanism (not shown) such as a bus, a controller, or a network, interconnects the components of the computing environment 300. Typically, operating system software (not shown) provides an operating environment for other software executing in the computing environment 300, and coordinates activities of the components of the computing environment 300.

The store 340 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 300. The storage 340 stores instructions for the software 380, which can implement technologies described herein.

The store 340 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 350 may be a touch input device, such as a keyboard, keypad, mouse, pen, touchscreen, touch pad, or trackball, a voice input device, a scanning device, or another device, that provides input to the computing environment 300. For audio, the input device(s) 350 may include a microphone or other transducer (e.g., a sound card or similar device that accepts audio input in analog or digital form), or a computer-readable media reader that provides audio samples to the computing environment 300.

The output device(s) 360 may be a display, printer, speaker transducer, DVD-writer, or another device that provides output from the computing environment 300.

The communication connection(s) 370 enable communication over a communication medium (e.g., a connecting network) to another computing entity. The communication medium conveys information such as computer-executable instructions, compressed graphics information, processed signal information (including processed audio signals), or other data in a modulated data signal.

Thus, disclosed computing environments are suitable for transforming an artificial terrain map as disclosed herein into a human-perceivable form. As well, or alternatively, disclosed computing environments are suitable for transforming an artificial terrain map as disclosed herein into a modulated signal and conveying the modulated signal over a communication connection Machine-readable media are any available media that can be accessed within a computing environment 300. By way of example, and not limitation, with the computing environment 300, machine-readable media include memory 320, storage 340, communication media (not shown), and combinations of any of the above. Tangible machine-readable (or computer-readable) media exclude transitory signals.

X. Other Embodiments

The examples described above generally concern apparatus, methods, and related systems for procedurally altering artificial terrain maps. Nonetheless, embodiments other than those described above in detail are contemplated based on the principles disclosed herein, together with any attendant changes in configurations of the respective apparatus described herein.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of image and other processing techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to procedurally alter an artificial terrain map. For example, modules identified as constituting a portion of a given computational engine in the above description or in the drawings can be partitioned differently than described herein, distributed among one or more modules, or omitted altogether. As well, such modules can be implemented as a portion of a different computational engine without departing from some disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:
1. A computing environment having a processor, a memory, and an output device, wherein the memory stores instructions that, when executed by the processor, cause the computing environment to carry out a method for generating an artificial terrain map, the method comprising
   computing a region of a noise map in an N-dimensional space and defining a terrain characteristic in correspondence with a value of the noise map at each of a selected plurality of positions within the region of the noise map;
   projecting the terrain characteristic at each of a selected plurality of positions within the region of the noise map on a single line segment and rendering a first map of an artificial terrain based on the projection; and
   scaling or otherwise manipulating the first map of the artificial terrain by translating, rotating, zooming, or replacing the first map of the artificial terrain in correspondence with a scaling or other manipulation of the single line segment to generate a scaled or otherwise manipulated version of the map of the artificial terrain, wherein the scaling or other manipulation of the single line segment comprises one or more of a rotation of the single line segment, a translation of the single line segment, a lengthening of the single line segment, and a shortening of the single line segment; and
   with the output device, rendering the scaled or otherwise manipulated version of the map of the artificial terrain.

2. The computing environment according to claim 1, wherein the N-dimensional space comprises a two-dimensional plane, and the region of the noise map comprises a planar region, wherein the single line segment lies within the planar region.

3. The computing environment according to claim 2, wherein the terrain characteristic comprises a measure of elevation.

4. The computing environment according to claim 3, wherein the act of rendering the first map of the artificial terrain based on the projection comprises rendering a two-dimensional elevation profile.

5. The computing environment according to claim 2, wherein the translation of the single line segment comprises a selected one or more of a translation of the single line segment in a direction parallel to the single line segment, and a translation of the single line segment in a direction perpendicular to the single line segment.

6. The computing environment according to claim 5, wherein the act of scaling or otherwise manipulating the first map of the artificial terrain in correspondence with a translation of the single line segment in a direction perpendicular to the single line segment or with a rotation of the line segment about a point on the single line segment comprises replacing the first map of the artificial terrain with another rendered map; wherein the act of scaling or otherwise manipulating the first map of the artificial terrain in correspondence with a translation of the single line segment in a direction parallel to the single line segment comprises translating the first map of the artificial terrain; wherein the act of scaling or otherwise manipulating the first map of the artificial terrain in correspondence with an extension of the single line segment comprises zooming out from the first map of the artificial terrain; and wherein the act of scaling or otherwise manipulating the first map of the artificial terrain in correspondence with a shortening of the single line segment comprises zooming in on a portion of the first map of the artificial terrain.

7. The computing environment according to claim 2, wherein the method further comprises storing the projection of the terrain characteristic, wherein the projection comprises a value of the terrain characteristic corresponding to each of the selected plurality of positions within the region of the noise map.

8. The computing environment according to claim 7, wherein the act of storing the values comprises storing the values in an indexed array, and wherein each index corresponds to a position in the region of the noise map.

9. The computing environment according to claim 8, wherein the method further comprises estimating a value of the noise map or the terrain characteristic at a position between two positions corresponding to respectively adjacent indexed entries in the array.

10. The computing environment according to claim 1, wherein the act of computing a region of the noise map comprises computing a selected number of samples in the N-dimensional space and storing the samples in an array having a plurality of indexed elements, wherein each indexed element in the array corresponds to a selected set of coordinates in the N-dimensional space and the corresponding sample stored in the respective indexed element represents a measure of the value of the noise map at the respective set of coordinates, wherein the act of defining a terrain characteristic in correspondence with a value of the noise map at each of a selected plurality of positions within the region of the noise map comprises estimating a value of the noise map at one or more sets of coordinates different from a set of coordinates corresponding to an indexed element from two or more samples stored in the indexed array.

11. The computing environment according to claim 1, wherein the act of computing a region of the noise map comprises selecting a target time allotted to compute the noise map and selecting a number of samples over which to compute the noise map to correspond to the selected target time.

12. The computing environment according to claim 1, wherein the N-dimensional space comprises a three-dimensional space, wherein the single line segment lies in a planar region within the three-dimensional space.

13. The computing environment according to claim 12, wherein the scaling or other manipulation of the lower-dimensional sub-space comprises a selected one or more of a translation of the planar region in a direction parallel to the planar region, a translation of the planar region in a direction perpendicular to the planar region, a shortening of the planar region in one or both ordinate directions, an extension of a length of the planar region in one or both ordinate directions, and a rotation of the planar region in one or more of pitch, yaw, and roll.

14. A computing environment having a processor, a memory, and an output device, wherein the memory stores instructions that, when executed by the processor, cause the computing environment to carry out a method for generating an artificial terrain map, the method comprising:
  computing a region of a noise map in an N-dimensional space and defining a terrain characteristic in correspondence with a value of the noise map at each of a selected plurality of positions within the region of the noise map, wherein the act of computing a region of the noise map comprises selecting a target time allotted to compute the noise map and adjusting a selected number of samples to correspond to the selected target time;
  projecting the terrain characteristic at each of a selected plurality of positions within the region of the noise map on a lower-dimensional sub-space and rendering a first map of an artificial terrain based on the projection;
  scaling or otherwise manipulating the first map of the artificial terrain in correspondence with a scaling or other manipulation of the lower-dimensional sub-space to generate a scaled or otherwise manipulated version of the map of the artificial terrain; and
  with the output device, rendering the scaled or otherwise manipulated version of the map of the artificial terrain.

15. The computing environment according to claim 14, wherein the act of adjusting the selected number of samples further comprises selecting the number of samples based at least in part on a duration required to perform the act of computing a region of the noise map at one or more earlier times.

16. A computing environment having a processor, a memory, and an output device, wherein the memory stores instructions that, when executed by the processor, cause the computing environment to carry out a method for generating an artificial terrain map, the method comprising:
  computing a region of a noise map in an N-dimensional space and defining a terrain characteristic in correspondence with a value of the noise map at each of a selected plurality of positions within the region of the noise map;
  projecting the terrain characteristic at each of a selected plurality of positions within the region of the noise map on a planar region and rendering a first map of an artificial terrain based on the projection; and scaling or otherwise manipulating the first map of the artificial terrain by one or more of translating the planar region in a direction parallel to the planar region, translating the planar region in a direction perpendicular to the planar region, shortening the planar region in one or both ordinate directions, extending a length of the planar region in one or both ordinate directions, and rotating the planar region in one or more of pitch, yaw, and roll, wherein the act of scaling or otherwise manipulating the first map of the artificial terrain by translating the planar region in a direction perpendicular to the planar region or rotating the planar region comprises replacing the first map of the artificial terrain with another rendered map; wherein the act of scaling or otherwise manipulating the first map of the artificial terrain by translating the planar region in a direction parallel to the planar region comprises translating the first map of the artificial terrain; wherein the act of scaling or otherwise manipulating the map of the artificial terrain by extending a length of the planar region in one or both ordinate directions comprises zooming out from the first map of the artificial terrain; and wherein the act of scaling or otherwise manipulating the first map of the artificial terrain by shortening the planar region in one or both ordinate directions comprises zooming in on a portion of the first map of the artificial terrain.

17. A tangible, non-transitory, computer-readable medium containing instructions that, when executed by a processor of a computing environment, cause the computing environment to perform a method comprising:
    computing a region of a noise map in an N-dimensional space and defining a terrain characteristic in correspondence with a value of the noise map at each of a selected plurality of positions within the region of the noise map;
    projecting the terrain characteristic at each of a selected plurality of positions within the region of the noise map on a single line segment and rendering a map of an artificial terrain based on the projection;
    scaling or otherwise manipulating the map of the artificial terrain by translating, rotating, zooming, or replacing the map of the artificial terrain in correspondence with a scaling or other manipulation of the single line segment to generate a scaled or otherwise manipulated version of the map of the artificial terrain, wherein the scaling or other manipulation of the single line segment comprises one or more of a rotation of the single line segment, a translation of the single line segment, a lengthening of the single line segment, and a shortening of the single line segment; and
    rendering the scaled or otherwise manipulated version of the map of the artificial terrain.

18. The computer readable medium of claim 17, wherein the terrain characteristic comprises an elevation, and the act of rendering a map of the artificial terrain based on the projection comprises rendering a two-dimensional elevation profile.

19. The computer readable medium of claim 17, wherein:
    the translation of the single line segment comprises a selected one or more of a translation of the single line segment in a direction parallel to the single line segment, and a translation of the single line segment in a direction perpendicular to the single line segment;
    the act of scaling or otherwise manipulating the map of the artificial terrain in correspondence with a translation of the single line segment in a direction perpendicular to the line segment or with a rotation of the single line segment comprises replacing the rendered map of the artificial terrain with another rendered map; and
    the act of scaling or otherwise manipulating the map of the artificial terrain in correspondence with a translation of the single line segment in a direction parallel to the single line segment comprises translating the map of the artificial terrain;
    the act of scaling or otherwise manipulating the map of the artificial terrain in correspondence with an extension of the single line segment comprises zooming out from the map of the artificial terrain; and
    the act of scaling or otherwise manipulating the map of the artificial terrain in correspondence with a shortening of the single line segment comprises zooming in on a portion of the map of the artificial terrain.

20. A tangible, non-transitory, computer readable medium containing instructions that, when executed by a processor of a computing environment, cause the computing environment to perform a method comprising:
    computing a region of a noise map in an N-dimensional space and defining a terrain characteristic in correspondence with a value of the noise map at each of a selected plurality of positions within the region of the noise map;
    projecting the terrain characteristic at each of a selected plurality of positions within the region of the noise map on a planar region and rendering a map of an artificial terrain based on the projection;
    scaling or otherwise manipulating the map of the artificial terrain by translating, rotating, zooming, or replacing the map of the artificial terrain in correspondence with a scaling or otherwise manipulating the planar region to generate a scaled or otherwise manipulated version of the map of the artificial terrain, wherein the act of scaling or otherwise manipulating planar region comprises a selected one or more of translating the planar region in a direction parallel to the planar region, translating the planar region in a direction perpendicular to the planar region, shortening the planar region in one or both ordinate directions defining the planar region, extending a length of the planar region in one or both ordinate directions defining the planar region, and rotating the planar region in one or more of pitch, yaw, and roll; and
    rendering the scaled or otherwise manipulated version of the map of the artificial terrain; wherein,
    the act of scaling or otherwise manipulating the map of the artificial terrain in correspondence with translating the planar region in a direction perpendicular to the planar region or with rotating the planar region comprises replacing the map of the artificial terrain with another rendered map;
    the act of scaling or otherwise manipulating the map of the artificial terrain in correspondence with translating the planar region in a direction parallel to the planar region comprises translating the map of the artificial terrain;
    the act of scaling or otherwise manipulating the map of the artificial terrain in correspondence with extending a length of the planar region in one or both ordinate directions comprises zooming out from the map of the artificial terrain; and
    the act of scaling or otherwise manipulating the map of the artificial terrain in correspondence with shortening the planar region in one or both ordinate directions comprises zooming in on a portion of the map of the artificial terrain.

\* \* \* \* \*